United States Patent
Kokkeby et al.

(10) Patent No.: US 9,026,272 B2
(45) Date of Patent: May 5, 2015

(54) METHODS FOR AUTONOMOUS TRACKING AND SURVEILLANCE

(75) Inventors: Kristen L. Kokkeby, Corona, CA (US);
Robert P. Lutter, Tacoma, WA (US);
Michael L. Munoz, Tacoma, WA (US);
Frederick W. Cathey, Seattle, WA (US);
David J. Hilliard, Shoreline, WA (US);
Trevor L. Olson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1246 days.

(21) Appl. No.: 12/334,325

(22) Filed: Dec. 12, 2008

(65) Prior Publication Data

US 2010/0042269 A1    Feb. 18, 2010

Related U.S. Application Data

(63) Continuation-in-part of application No. 11/956,711, filed on Dec. 14, 2007.

(51) Int. Cl.
*G01C 23/00* (2006.01)
*G05D 1/00* (2006.01)
(Continued)

(52) U.S. Cl.
CPC ............. *G01S 3/7864* (2013.01); *G01S 13/723* (2013.01)

(58) Field of Classification Search
USPC .......................................................... 701/3
See application file for complete search history.

(56) References Cited

U.S. PATENT DOCUMENTS 6,975,246 B1    12/2005    Trudeau
7,127,334 B2    10/2006    Frink
(Continued)

FOREIGN PATENT DOCUMENTS

EP           1 857 768        11/2007

OTHER PUBLICATIONS

Dogan et al.; "Unmanned Aerial Vehicle Dynamic-Target Pursuit by Using Probabilistic Threat Exposure Map"; Journal of Guidance, Control and Dynamics; vol. 29, No. 4, pp. 944-945; Jul. 2006.
(Continued)

*Primary Examiner* — Imran Mustafa
(74) *Attorney, Agent, or Firm* — Yee & Associates, P.C.

(57) ABSTRACT

A system and methods for autonomously tracking and simultaneously providing surveillance of a target from air vehicles. In one embodiment the system receives inputs from outside sources, creates tracks, identifies the targets and generates flight plans for unmanned air vehicles (UAVs) and camera controls for surveillance of the targets. The system uses predictive algorithms and aircraft control laws. The system comprises a plurality of modules configured to accomplish these tasks. One embodiment comprises an automatic target recognition (ATR) module configured to receive video information, process the video information, and produce ATR information including target information. The embodiment further comprises a multisensor integrator (MSI) module configured to receive the ATR information, an air vehicle state input and a target state input, process the inputs and produce track information for the target. The embodiment further comprises a target module configured to receive the track information, process the track information, and produce predicted future state target information. The embodiment further comprises an ownship module configured to receive the track information, process the track information, and produce predicted future state air vehicle information. The embodiment further comprises a planner module configured to receive the predicted future state target information and the predicted future state air vehicle information and generate travel path information including flight and camera steering commands for the air vehicle.

20 Claims, 9 Drawing Sheets

(51) Int. Cl.
*G05D 3/00* (2006.01)
*G06F 7/00* (2006.01)
*G06F 17/00* (2006.01)
*G01S 3/786* (2006.01)
*G01S 13/72* (2006.01)

(56) References Cited

U.S. PATENT DOCUMENTS

| | | | |
|---|---|---|---|
| 7,299,130 B2* | 11/2007 | Mulligan et al. | 701/13 |
| 8,102,423 B2 | 1/2012 | Cheng | |
| 2001/0043721 A1 | 11/2001 | Kravets et al. | |
| 2003/0164794 A1* | 9/2003 | Haynes et al. | 342/353 |
| 2004/0125228 A1 | 7/2004 | Dougherty | |
| 2004/0249519 A1* | 12/2004 | Frink | 701/3 |
| 2006/0074557 A1* | 4/2006 | Mulligan et al. | 701/213 |
| 2006/0077255 A1 | 4/2006 | Cheng | |
| 2006/0085106 A1* | 4/2006 | Gaudiano et al. | 701/23 |
| 2007/0250260 A1* | 10/2007 | Ariyur et al. | 701/207 |
| 2008/0071431 A1* | 3/2008 | Dockter et al. | 701/3 |
| 2008/0117858 A1* | 5/2008 | Kauffman | 370/316 |
| 2009/0157233 A1 | 6/2009 | Kokkeby et al. | |
| 2010/0121574 A1 | 5/2010 | Ariyur et al. | |
| 2010/0250022 A1 | 9/2010 | Hines et al. | |

OTHER PUBLICATIONS

Lee et al.; "Strategies of Path-Planning for a UAV to Track a Ground Vehicle"; The Second Annual Symposium on Autonomous Intelligent Networks and Systems; Jun. 30, 2003 to Jul. 1, 2003; Menlo Park, CA, US; http://path.berkeley.edu/ains/final/002%20-%2008-hedrick.pdf; Retrieved from the Internet on May 13, 2009.

Rafi et al.; "Autonomous Target Following by Unmanned Aerial Vehicles"; Proceedings of the SPIE—The International Society for Optical Engineering; vol. 6230, No. 1, pp. 1-8; 2006.

Hoffmann et al.; "UAV Sensor-Suite Demonstrator"; Workshop Der DGLR Fachausschüsse T6.2 Avionik und Sensorik & T6.3 Informationsverarbeitung und Automation; Feb. 14, 2007; Neubiberg B. Munchen; http://wwww.t6.dglr.de/Veranstaltungen/2007_UAV_Fuehrungsaspekte/11Hoffman/UAV_Sensor-Suite_DGLR_2007.pdf; pp. 1-23; Retrieved from the Internet on May 12, 2009.

Search Report from EPO on co-pending EP application (08171682.1) dated May 26, 2009.

USPTO Final Office action dated Aug. 2, 2011 for U.S. Appl. No. 11/956,711.

USPTO final office action dated Aug. 2, 2011 regarding U.S. Appl. No. 11/956,711, 12 pages.

USPTO non-final office action dated Dec. 22, 2011 regarding U.S. Appl. No. 11/956,711, 14 pages.

USPTO non-final office action dated Mar. 4, 2011 regarding U.S. Appl. No. 11/956,711, 10 pages.

USPTO final office action dated Jun. 8, 2012 regarding U.S. Appl. No. 11/956,711, 17 pages.

Response to office action dated Mar. 22, 2012 regarding U.S. Appl. No. 11/956,711, 14 pages.

Response to office action dated Apr. 21, 2011 regarding U.S. Appl. No. 11/956,711, 15 pages.

Amendment submitted with RCE dated Nov. 2, 2011 regarding U.S. Appl. No. 11/956,711, 15 pages.

Notice of Allowance, dated Nov. 13, 2013, regarding USPTO U.S. Appl. No. 11/956,711, 12 pages.

Non-final office action dated Jun. 20, 2013 regarding U.S. Appl. No. 11/956,711, 29 pages.

* cited by examiner

METHODS FOR AUTONOMOUS TRACKING AND SURVEILLANCE

CROSS-REFERENCE TO RELATED APPLICATION

This application is a continuation-in-part of application Ser. No. 11/956,711, filed on Dec. 14, 2007, the entire contents of which are hereby incorporated by reference.

BACKGROUND

1. Technical Field

The present disclosure relates to control of unmanned air vehicles (UAVs), tracking moving targets, surveilling areas, stationary targets and moving targets, protecting assets and people, and providing communications between individuals or groups.

2. Description of Related Art

Aerial surveillance and tracking includes the use of unmanned air vehicles. Currently, human operators remotely control UAVs. The operators must steer both the UAV and the camera/surveillance payload in order to maintain tracking and positive identification of a moving target. Positive identification may require no interruptions or obstructions in visual observation of the target. This practice is labor intensive, and therefore expensive. Usually two operators track a single target, enabling one operator to control flight and the other operator to control camera pointing, focus, zoom, etc. And in military applications involving high value targets, such as known terrorists, usually two UAVs are dedicated to the target, thus requiring four operators. Remotely controlling UAVs with human operators is also prone to loss of positive identification due to bad vehicle position or bad camera angle. Current methods also do not adequately support real time collection of target attribute data. In addition, the operators must pay special attention to no fly zones, restricted airspace and obstructions, further increasing the difficulty of maintaining an uninterrupted track.

SUMMARY

The embodiments of the present system and methods for autonomous tracking and surveillance have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description", one will understand how the features of the present embodiments provide advantages, which include a reduction in the number of human operators needed to operate the system, which in turn translates into cost savings, a reduction in the likelihood that tracked targets will be lost, a decrease in the risk that UAVs will be lost due to crashes/collisions, and a decrease in the risk that UAVs will enter no fly zones.

One aspect of the present system and methods for autonomous tracking and surveillance includes the realization that current systems for tracking and surveillance are heavily dependent upon human operators. This dependence upon humans is costly, and subject to losses of target/track data due to bad vehicle position or bad camera angle. Human error is frequently to blame for these losses. Accordingly, a system and methods for automating surveillance, targeting and tracking functions would save costs and reduce errors.

One aspect of the present embodiments includes a method of protecting an asset using at least one unmanned vehicle. The method includes establishing a plurality of boundaries around the asset. The boundaries define edges of zones. The method further includes observing a target in a first one of the zones. The method further includes deploying the unmanned vehicle to a location in a vicinity of the asset and tasking the vehicle to perform a first defensive measure as long as the target remains in the first zone. If the target crosses a boundary from the first zone into a second one of the zones, where the second zone is more proximate to the asset than the first zone, the method further includes tasking the vehicle to perform a second defensive measure.

Another aspect of the present embodiments includes a method of providing communication between a first individual or group and a second individual or group, where the first individual or group and the second individual or group cannot communicate directly with one another. The method includes deploying an unmanned vehicle to a location in a vicinity of both the first individual or group and the second individual or group, such that the first individual or group is capable of communicating directly with the vehicle and the second individual or group is capable of communicating directly with the vehicle, but the first individual or group and the second individual or group cannot communicate directly with one another. The method further includes relaying communications between the first individual or group and the second individual or group through the vehicle. The method further includes the vehicle autonomously tracking the first individual or group to maintain a desired distance between the vehicle and the first individual or group. Autonomously tracking includes generating a travel path for the vehicle based on predicted future states of the vehicle and the first individual or group.

Another aspect of the present embodiments includes a method of securing an area prior to a vehicle entering the area in order to protect the vehicle and persons within the vehicle or within the area. The method includes controlling an unmanned vehicle from the vehicle. The method further includes commanding the unmanned vehicle to enter the area prior to the vehicle's arrival. The method further includes commanding the unmanned vehicle to surveil the area and locate targets, if any targets are present in the area. If targets are present in the area, the method further includes commanding the unmanned vehicle to determine whether the targets pose a threat to the vehicle. If the targets pose a threat to the vehicle, the method further includes commanding the unmanned vehicle to neutralize the threat.

The features, functions, and advantages of the present embodiments can be achieved independently in various embodiments, or may be combined in yet other embodiments.

BRIEF DESCRIPTION OF THE DRAWINGS

The embodiments of the present system and methods for autonomous tracking and surveillance now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Embodiments of the present system and methods for autonomous tracking and surveillance are configured to enable an unmanned air vehicle (UAV) continuously to observe stationary targets and track moving targets while maintaining a low risk that the surveillance asset will be discovered. The targets may be ground-based, airborne and/or seaborne. The targets may be fixed structures, such as buildings, and may even be subsurface. The automated UAVs may also conduct general surveillance of an area, such as for defense of a base or fleet, and for monitoring roadsides for improvised explosive devices (IEDS) to protect ground-based convoys. The present system may be applied in both military and civilian environments. For example, the military may use the system to surveil hostile areas in search of military targets, or a police department may use the system to track fleeing suspects.

The system accepts target data and UAV data, and may accept other data, such as obstruction data and/or "blue force" data from the UAV or a ground station. The system then determines the best navigation route to maintain an advantageous slant range to the target for high quality camera imaging and a low probability of intercept (LPOI). The system then computes trajectories/flight paths to reduce the likelihood of discovery of the UAV, also referred to herein as "ownship." The system may incorporate numerous tracking and maneuver techniques, including weaves, orbits, escapes, and lead/lag pursuit course estimations. The system also controls the camera aboard the UAV to maintain uninterrupted visual contact with the target. The system is adapted to control both navigation and camera functions simultaneously.

Because the present system is automated, it drastically reduces the workload of any operator(s) monitoring the system. The system thus enables tracking of high value moving targets while reducing the likelihood of a loss of positive identification (interruption in target viewing) during target tracking. The operator can "fly the camera," because he or she is relieved of the dual duty of navigating the UAV and maintaining the desired pointing of the camera. The operator is thus able to focus on stalking targets, scanning borders, looking for IEDs, etc. The system also enables a single operator to track multiple moving targets simultaneously, increasing the probability of engaging a high value target after an external attack or a base intrusion incident. Because one operator working at a single location, such as an Insitu Multiple UAV Software Environment (IMUSE) station, may track multiple targets, the present system reduces the logistical footprint necessary for target tracking. The present system also allows an operator to control multiple UAVs to track maritime targets. It can establish a visual identification area around deep sea and littoral fleets to monitor, track and identify small or large moving objects.

Figure 1:
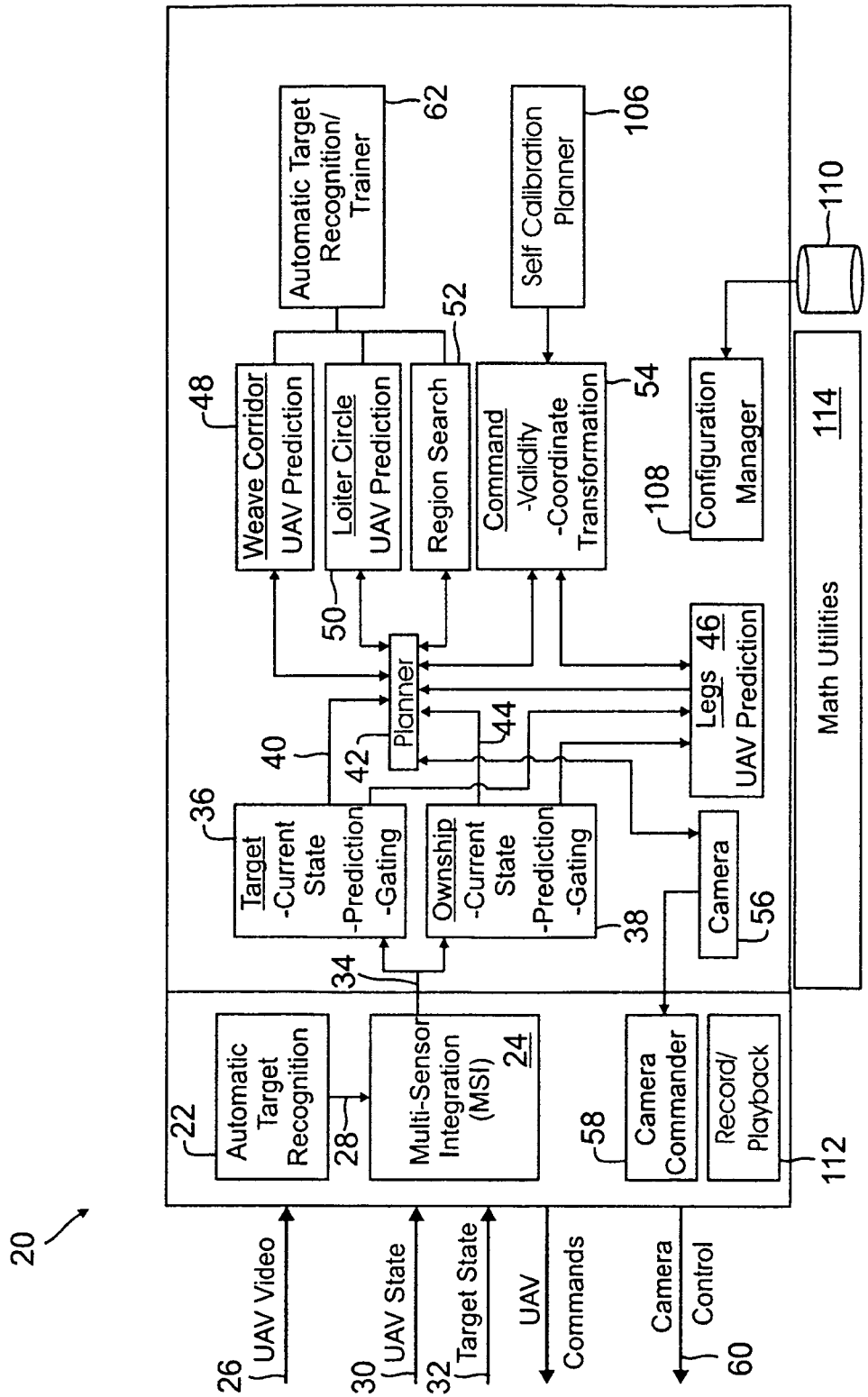
FIG. 1 is a functional block diagram of one embodiment of the present system and methods for autonomous tracking and surveillance.

In one embodiment, a system, also referred to herein as a "Stalker system," and associated methods provide automatic generation of UAV and camera steering controls for target following. The Stalker system itself may be implemented as software executable code, specialized application specific integrated circuits (ASICs), or a combination thereof, where some functions are implemented in hardware and others in executable code. In a high-level sense, the Stalker system can operate as a finite state machine where the states are steps in a plan to achieve a certain desired trajectory. The Stalker system accepts target and UAV state updates, and when engaged may be queried for UAV and camera commands. FIG. 1, which is described in detail below, illustrates this process. Each UAV command query checks for a planning state transition and may output a new UAV steering command depending upon the selected mode.

Embodiments of the Stalker system support at least four main functions. One function is generating UAV and camera positions and orientations for stalking a cooperative moving target. A cooperative moving target is one that actively publishes its own geodetic position, as is typical of friendly forces. Another function is generating UAV and camera position and orientation commands for stalking a non-cooperative moving target, whether the tracking is autonomous, or by an operator using a camera joystick. A non-cooperative moving target is one whose position must be observed through the use of electronic sensors and operator inputs, as is typical of hostile forces. Another function is generating UAV and camera position and orientation commands for automatic camera and position calibration to reduce target location errors. Another function is generating UAV and camera position and orientation commands for stalking a roadside or a search area, and generating subsequent commands to revisit targets if targets of interest are detected in those specified areas.

One goal of the Stalker system is to establish and maintain a range to target between preset minimum and maximum values. These values are specified to provide a large number of pixels on the target, while maintaining noise and visual signatures that the target is not likely to detect. Another goal of the Stalker system is to maintain an uninterrupted line of sight to the target, taking care to avoid obstructing viewing angles with the wing and fuselage.

Figure 8:
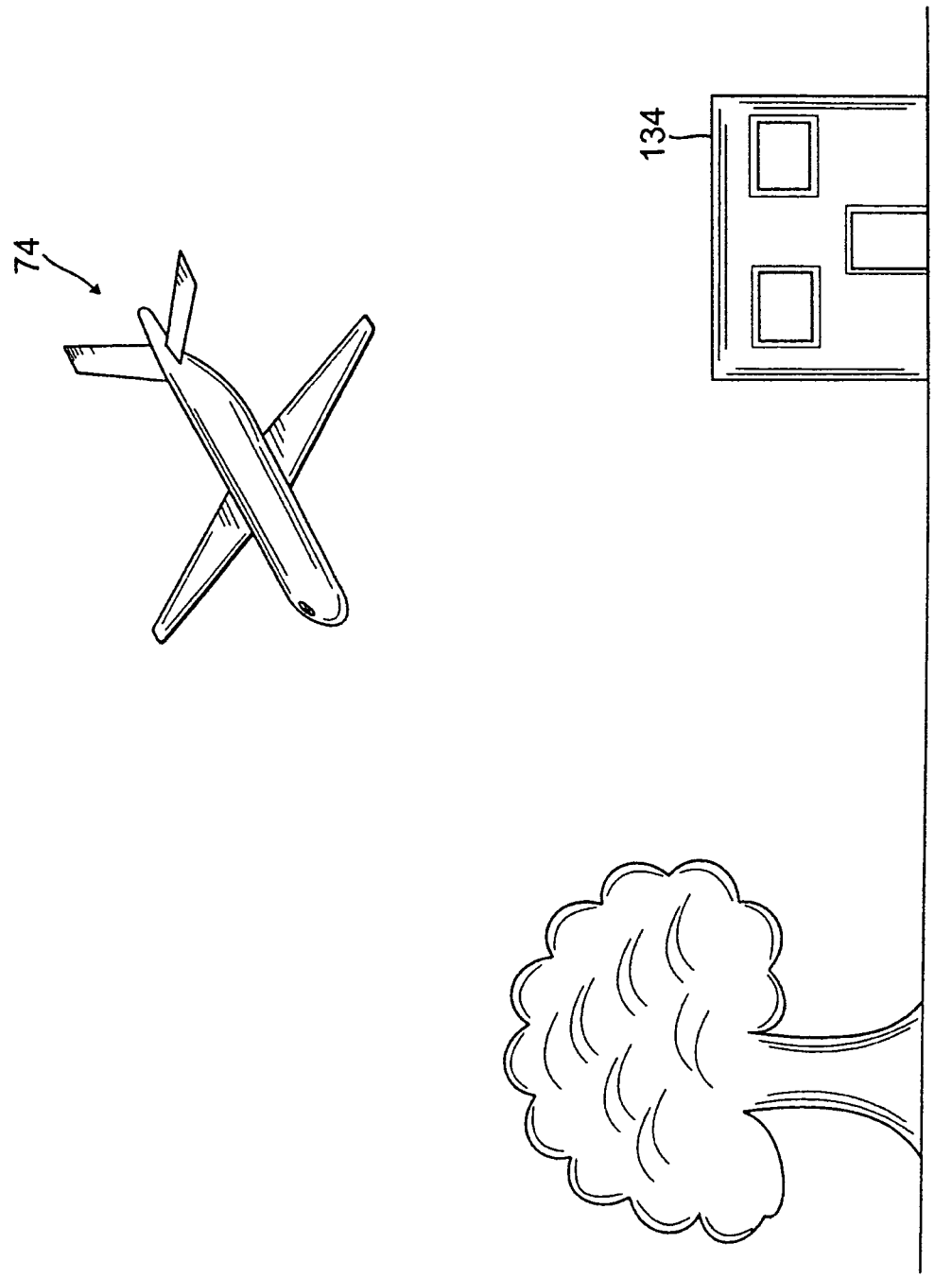
FIG. 8 is a schematic view of one embodiment of the present system including a UAV and a ground station.

In embodiments of the present system, a UAV (not shown) includes at least one video camera, which may be a digital camera. For simplicity the singular form of camera will be used throughout, although those of ordinary skill in the art will appreciate that the UAV may include more than one camera. The UAV further includes a plurality of sensors. A first subset of the sensors detects various states of the UAV, while a second subset of the sensors detects various states of the target. The detected states may include, but are not limited to position, orientation, heading, speed, acceleration and other kinematic states, size, type and/or class of the target, and other states. A video signal generated by the camera and signals generated by the sensors are transmitted to hardware components that use the signals to visualize and track the target. FIG. 1 illustrates some of these components. Some or all of the components illustrated in FIG. 1 could be located on the UAV or they could be located at one or more ground stations. The components could also be split between the UAV and one or more ground stations. FIG. 8 illustrates an example embodiment of the present system including a UAV 74 and a ground station 134.

As used in this disclosure, the terms "component", "module," "system," and the like are intended to refer to a computer-related entity, either hardware, software, or a combination of hardware and software, in execution. For example, a component may be, but is not limited to being, a process running on a processor, a processor, a hardware component, an object, an executable, a thread of execution, a program, and/or a computing system. Also, these components can execute from various computer readable media having various data structures stored thereon. Computer executable components (or code) can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

With reference to FIG. 1, one embodiment of the present system 20 includes an automatic target recognition (ATR) module 22 and a multi-sensor integration (MSI) module 24. As used herein, the term module may include any combination of hardware, firmware, and software to implement the functions described. The ATR module 22 receives a video signal 26 from the UAV (not shown). The ATR module 22 includes instructions to analyze the video signal 26 and generates an output 28 that it sends to the MSI module 24. In addition to the ATR output 28, the MSI module 24 also receives a UAV state signal 30 and a target state signal 32. The signals 30, 32 are generated by the sensors described above, and may also be generated by other sources observing the UAV and/or the targets, such as ground-based observers, radar, satellites, etc. All of these signals include information about the states of the UAV and the targets, which may include position, orientation, heading, speed, acceleration and/or other kinematic states, size, type and/or class of the target, and other states.

The MSI module 24 receives inputs 28, 30, 32 described above and processes the data therein to produce an output 34. The MSI module output 34 is referred to herein as track information or a track file. The track file 34 includes not only information regarding the kinematics of the UAV and the target, but also estimates of the accuracy of the data in the track file 34, and also target identification data, such as the size, class, and/or type of the target, whether the target is cooperative or non-cooperative, etc. Those of ordinary skill in the art will appreciate that the track file may or may not be stored in memory for subsequent retrieval. The word "file" is used broadly herein and does not imply that the process of producing the track file 34 includes an additional step of storing the file in memory.

The MSI module 24 sends the track file 34 to a target module 36 and an ownship module 38. The target module 36 processes the data in the track file 34 relating to the current state of the target, and compares (Gates) this data to previous predictions made regarding the current state of the target. The target module 36 uses all available data and comparisons between past predictions and current states, and makes further predictions about future states of the target. Gating in target module 36 produces an output 40 that it sends to a planner module 42.

Ownship module 38 processes the data in the track file 34 relating to the current state of the UAV, and compares (Gates) this data to previous predictions (not shown) made regarding the current state of the UAV. Discrepancies in the predicted state of the UAV versus its current state may be due to, for example, winds blowing the UAV off its intended course. The ownship module 38 uses all available data and comparisons between past predictions and current states, and makes further predictions about future states of the UAV. Gating in ownship module 38 then produces an output 44 that it sends to the planner module 42.

The planner module 42 combines the target module input 40 and the ownship module input 44 with additional data provided by a legs module 46, a weave corridor module 48, a loiter circle module 50, a region search module 52, a command module 54 and a camera module 56. The functions of each of these modules are described in detail below. Based on the various inputs, the planner module 42 builds a model for predicting future UAV states given its current state and the currently active command. The planner module 42 uses the model to predict future UAV states at certain critical times, and to establish goals, which in turn produce predicted UAV and camera positions. The planner 42 also combines all data to produce commands for course corrections and/or pattern adjustments for the UAV. These adjustments are described below with respect to three top-level goal states for the UAV. The present system 20 uses all of the functions described above extensively in stalking both cooperative and non-cooperative targets.

With continued reference to FIG. 1, the legs module 46 predicts a long-term flight path for the UAV. In support of the long-term predictions, the legs module 46 also predicts short-term legs that together make up the long-term flight path. The legs module 46 communicates its predictions to the planner module 42 to aid the planner module 42 in creating UAV commands to control the flight of the UAV.

With continued reference to FIG. 1, in certain embodiments the command module 54 includes data regarding the UAV mission environment. This data may include, for example, topographical terrain maps, locations of international borders, locations of obstructions and other data. The data may also include the locations and kinematics of other aircraft in the vicinity. By accessing the data in the command module 54, the present system 20 can command the UAV to maintain an uninterrupted track on a target while avoiding collisions/crashes and crossing into no fly zones. The command module 54 also validates UAV commands to ensure that the UAV is capable of executing the commands to achieve the desired flight path. For example, if a UAV command indicates that the UAV should execute a very tight turn that is beyond the UAVs physical limits, the validity function of the command module 54 will reject the command as being impossible for the UAV to execute.

With continued reference to FIG. 1, the present system 20 further comprises a camera module 56 and a camera commander module 58. The camera module 56 predicts future camera imaging characteristics, such as pointing, focus and zoom. The camera module 56 communicates with the planner module 42 and generates outputs for the camera commander module 58. The camera commander module 58 generates commands 60 for the camera, such as where to point and how to focus and zoom. Together the camera module 56 and the camera commander module 58, in conjunction with the planner module 42, automatically control camera functions in order to obtain an uninterrupted and high quality image of the target.

In certain embodiments the camera and/or sensors may provide additional information beyond that generally provided by traditional visual surveillance. For example, the camera/sensors may provide three-dimensional visual representations of the target. These three-dimensional views are enhanced by multi-aspect viewing of the target in accordance with the loiter, weave, and chase surveillance patterns described below. The camera/sensors may further provide thermal signature information, infrared signature information, color information, etc. for the target. All information collected by the camera/sensors may be provided to an ATR/Trainer module 62 (FIG. 1), described below, for use in future target identifications. Multiple aspect coverage of the target enables the automatic target recognition function of the present system 20, described below, to recognize geometric aspects of the target that are not available in two-dimensional or single aspect imagery, drastically decreasing the time necessary for the present system 20 to recognize the target.

Figure 2:
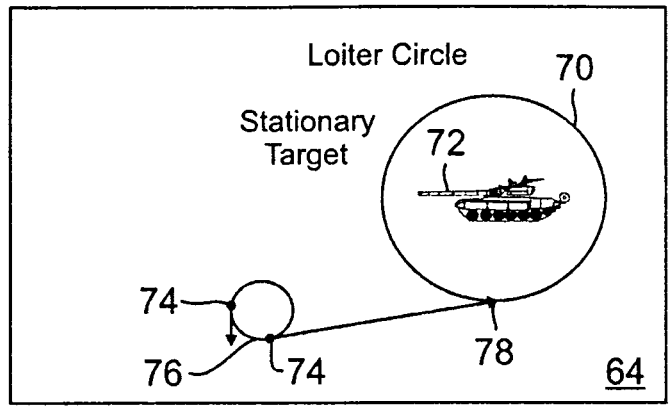
FIG. 2 is a schematic view of a loiter circle according to one embodiment of the present system and methods for autonomous tracking and surveillance.
Figure 3:
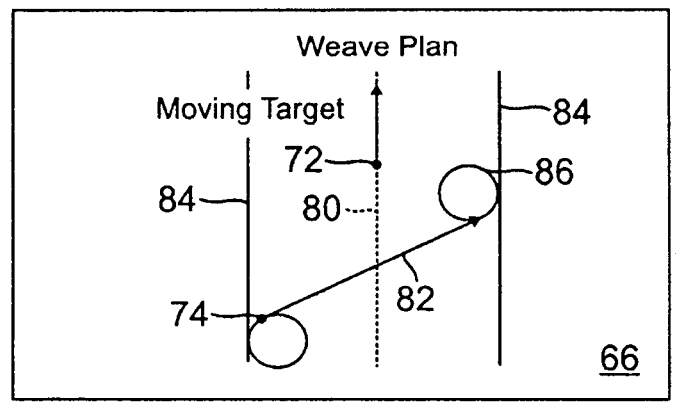
FIG. 3 is a schematic view of a weave plan according to one embodiment of the present system and methods for autonomous tracking and surveillance.
Figure 4:
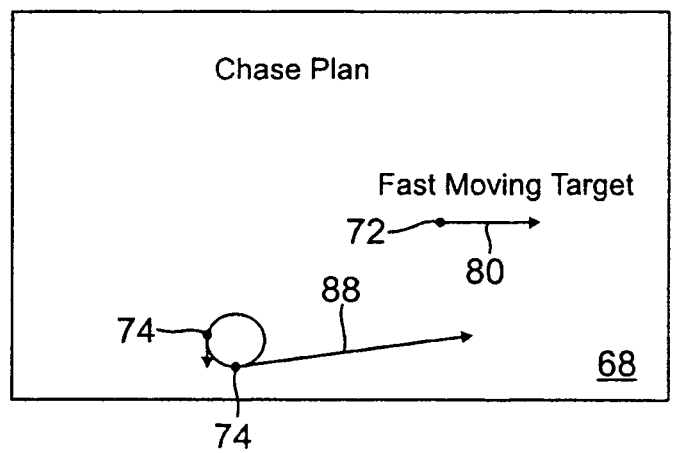
FIG. 4 is a schematic view of a chase plan according to one embodiment of the present system and methods for autonomous tracking and surveillance.

While in cooperative and non-cooperative stalking modes, and prior to receiving either the UAV state input 30 or the target state input 32, the Stalker system 20 is in a startup state. Once the system 20 has received both the UAV state input 30 and the target state input 32, the system 20 is queried for a steering command and/or a camera command. The system 20 then transitions from startup to a top-level goal state. These top-level goal states include loiter 64, weave 66, and chase 68, each of which are illustrated in FIGS. 2-4, respectively. Those of ordinary skill in the art will appreciate that additional top-level goal states may be provided depending upon the state of the target.

Each top-level goal state corresponds to a dynamically generated plan to attain a desired UAV trajectory for advantageous imaging quality while controlling visual and audio signatures of the UAV. Each top-level goal state is also intended to prevent overflight of the target, which could cause the target to detect the UAV. Consistent with these objectives, then, at least target speed and UAV speed determine the top-level goal. For example, if target speed is zero or near zero, the goal may be to loiter in a circle 70, as illustrated in FIG. 2. The loiter path 70 may encircle the target 72, or it may be somewhere in the vicinity of the target 72. Further, the loiter path 70 need not be a circle, but could be some other shape. If target speed is not near zero and is less than UAV speed, the goal may be to weave back and forth behind the target 72, as illustrated in FIG. 3. If target speed is high, the goal may be to chase the target 72, as illustrated in FIG. 4. The top-level goal changes dynamically as the target 72 accelerates, decelerates, stops and starts.

Corresponding to each top-level goal are goal-specific planning states, or steps to achieve the top-level goal. These steps are mapped to steering commands that are scheduled to be sent to the UAV at specified times. Planning a UAV trajectory involves reasoning in both space and time and predicting how the UAV will respond to commands. Therefore, accurately planning a UAV trajectory preferably includes an estimate of the command time latency and a model of how the UAV will maneuver when it executes the command.

When loitering, each UAV maneuver is executed pursuant to commands generated by the planner module 42 in conjunction with the loiter circle module 50 (FIG. 1). The loiter circle module 50 makes predictions regarding the future state of the UAV, which the planner module 42 uses to generate loiter commands for the UAV. In the case of a circular loiter path 70 (FIG. 2), a loiter command has three parts: a turn center (a co-altitude geodetic location), a turn radius, and a turn direction (clockwise or counter-clockwise as viewed from above). Thus, when the system 20 determines that the UAV should loiter, as when the target 72 is stopped, the planner 42 and the loiter circle module 50 generate at least one loiter point for the UAV. The loiter point(s) is/are sent to the hardware that controls the UAV's movement along with camera pointing commands.

In one embodiment, if the aircraft is outside the commanded loiter circle 70 then it executes a loiter command as follows. With reference to FIG. 2, the UAV 74 makes an initial turn 76 so that its direction of flight is tangential to the loiter circle 70 and is compatible with the commanded turn direction. The UAV 74 then flies straight to the tangent point 78. Upon reaching the tangent point 78 the UAV 74 flies around the loiter circle 70 until commanded to do otherwise. Each of these UAV maneuvers are executed pursuant to commands generated by the planner module 42 in conjunction with the loiter circle module 50 (FIG. 1).

When the loiter path 70 encircles the target 72, the loiter plan advantageously provides full 360° imaging of the target 72. Images captured and other sensor readings taken from such 360° degree sweeps can advantageously provide full geometric data regarding the target 72 to the ATR module 22. In one embodiment the ATR/Trainer module 62 (FIG. 1) automatically logs the target data and attempts to identify the target. If the target cannot be identified, then the ATR/Trainer module 62 classifies the target as a new entity and records the data. This data may be shared system wide, including continuous dissemination to other UAVs in the field. The present system 20 thus rapidly increases its knowledge base as UAVs in the field gather more and more data about new targets and share that data with other UAVs in the field.

With reference to FIG. 3, when commanded to execute a weave plan 66 the UAV 74 moves back and forth across the target's path of travel 80, and behind the target 72. When weaving, each UAV maneuver is executed pursuant to commands generated by the planner module 42 in conjunction with the weave corridor module 48 (FIG. 1). The weave corridor module 48 makes predictions regarding the future state of the UAV 74, which the planner module 42 uses to generate weave commands for the UAV 74. Again, the weave plan 66 is generally used for targets 72 that are traveling slower than or about the same speed as the UAV 74. The weave plan 66 provides for a snake-like motion behind the moving target 72, keeping visual and audio signatures at levels not likely to be detected by the target 72. The crisscrossing path 82 provides wide aspect coverage of the aft and sides of the target 72 for advantageous intelligence and potential ATR data. This technique also makes it extremely difficult for occupants of the target 72 to spot the UAV 74 due to their orientation away from the UAV 74.

The weave plan 66 may include boundaries 84 that extend substantially in the same direction as the target's path of travel 80. The weave corridor module 48 and/or the command module 54 may provide these boundaries 84. The boundaries 84 may be established to maintain a desired distance between the UAV 74 and the target 72, and/or, the boundaries 84 may coincide with national borders, no fly zones, physical obstructions, etc. When the UAV 74 approaches one of the boundaries 84, it may enter a circular path of travel 86 where it may execute one or more loops around the circle 86 before heading back across the target's path of travel 80 toward the opposite boundary 84. Those of ordinary skill in the art will appreciate that the weave plan 66 may embody other patterns besides that illustrated in FIG. 3. For example, the UAV 74 may weave back and forth without executing any of the substantially circular loops 86 near the boundaries 84.

With reference to FIG. 4, when commanded to execute a chase plan 68 the UAV 74 moves along a straight path 88 that may be parallel to the target's path of travel 80 or at an angle toward the target's path of travel 80. Again, the chase plan 68 is used for targets 72 moving faster than the UAV 74. By moving along a straight path 88 generally toward the target 72, the UAV 74 is enabled to catch up to, or at least stay with, a fast-moving target 72. In one embodiment of the present system 20, predictive logic establishes a lead or lag pursuit plan based upon ownship position and target kinematics in order to maximize the camera time on target. Predictions for camera position can also be generated to keep the camera on target while the chase ensues.

Figure 5:
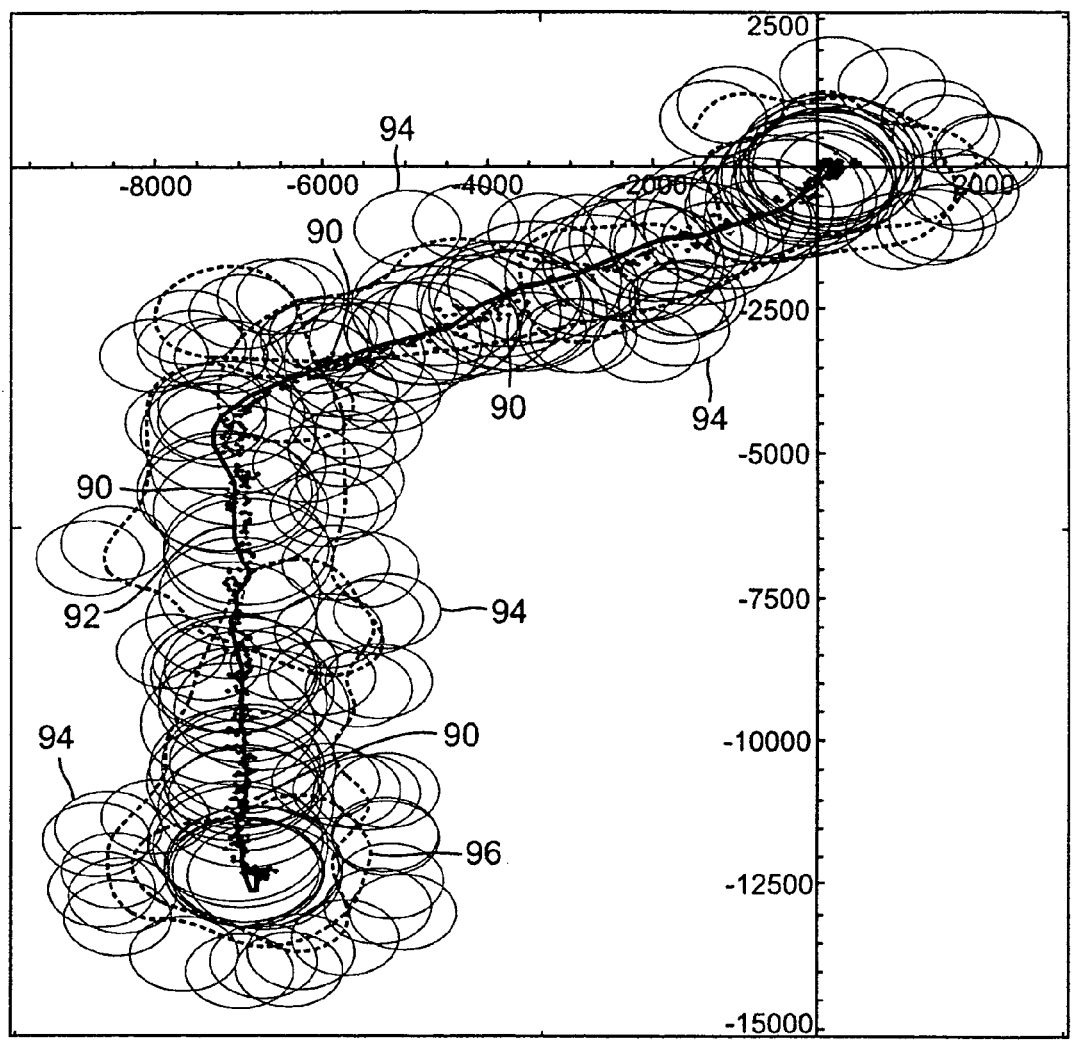
FIG. 5 is a schematic view of a method of smoothing noisy tracking data according to one embodiment.

The target kinematics, which are contained in the target state input 32 (FIG. 1), can be given to the Stalker system in several different modes. One mode is from a cooperative target. For example, the target may be located using GPS or tracked by an external source. Another mode is the operator tracking the moving target via joystick on an image. Another mode is tracking the object internally from external sensor reports such as electronic support measures (ESM), radar, automatic/assisted target recognition (ATR) feeds, identify friend/foe (IFF) or other kinematic updates. The first and third of these methods are stable and can be used in the goal and planning cycles as is. The second method, which involves an operator and a joystick, produces noisy data that is preferably smoothed in order to obtain a clear track for the target. With reference to FIG. 5, a plurality of dots 90 represent known locations of the target taken at various sampling intervals. The heavy black line 92 in FIG. 5 represents the smoothed trajectory of the target based on the data points 90. The data points 90 are provided by a UAV that is commanded to follow a progression of orbits 94 shown as ellipses in FIG. 5. The dashed line 96 indicates the actual flight path of the UAV as it transitions between the commanded orbits.

In certain embodiments of the present system 20 the UAV may be commanded to search for targets. In the search mode of operation, the UAV automatically searches a designated region, which may have any shape, including a circle, an ellipse, a polygon or any other shape. When searching, the UAV may limit visual and aural signatures to reduce the likelihood of the UAV being discovered. In the search mode of operation the region search module 52 (FIG. 1) establishes search boundaries, which may be loaded from the command module 54. While searching, it is advantageous for the UAV to avoid entering restricted airspace, avoid crossing over international borders into the airspace of uncooperative nations, and avoid collisions with terrain and man-made obstructions. Thus, the region search module 52 in conjunction with the command module 54 determines advantageous search patterns while accounting for terrain avoidance, border avoidance, obstruction avoidance, and RF link masking. As described above, in certain embodiments the command module 54 includes data such as topographical terrain maps and locations of borders and obstructions that the planner 42 and the region search module 52 can access to assist in avoiding collisions/crashes and crossing into no fly zones.

In some embodiments, while the UAV searches the system 20 compares the video signal 26 from the UAV with video from previous searches to locate possible targets. The system 20 may also process the video stream to locate new hot spots (using, for example, infrared scans), and identify pixel changes to detect scene changes. The system 20 may scan for infrared signatures, and may identify differences in the search area in the electro-optical (EO), infrared (IR) and electronic warfare (EW) bands to spot new targets in the area. The system 20 may process these inputs using the ATR/Trainer module 62 to identify known targets of opportunity. These functions may operate autonomously to detect and locate targets. Once a target is located, additional data may be collected. During the collection of additional data the UAV may follow one or more of the navigation plans outlined above (loiter 64, weave 66, chase 68) to collect sensor data while avoiding discovery of the UAV. Once desired data has been collected, the search pattern may resume.

In the search mode, the planner 42 and the region search module 52 may command the UAV to fly in a random fashion, following headings selected at random, and/or changing from one heading to the next at random intervals. Such random flight increases the difficulty of targeting the UAV from the ground, making it less likely that the UAV will be lost to enemy fire. Random flight also confuses ground forces as to the makeup, intended target(s) and number of UAVs covering an area, and makes it difficult for enemy forces to determine the launch/recovery location(s) of UAVs.

Figure 6:
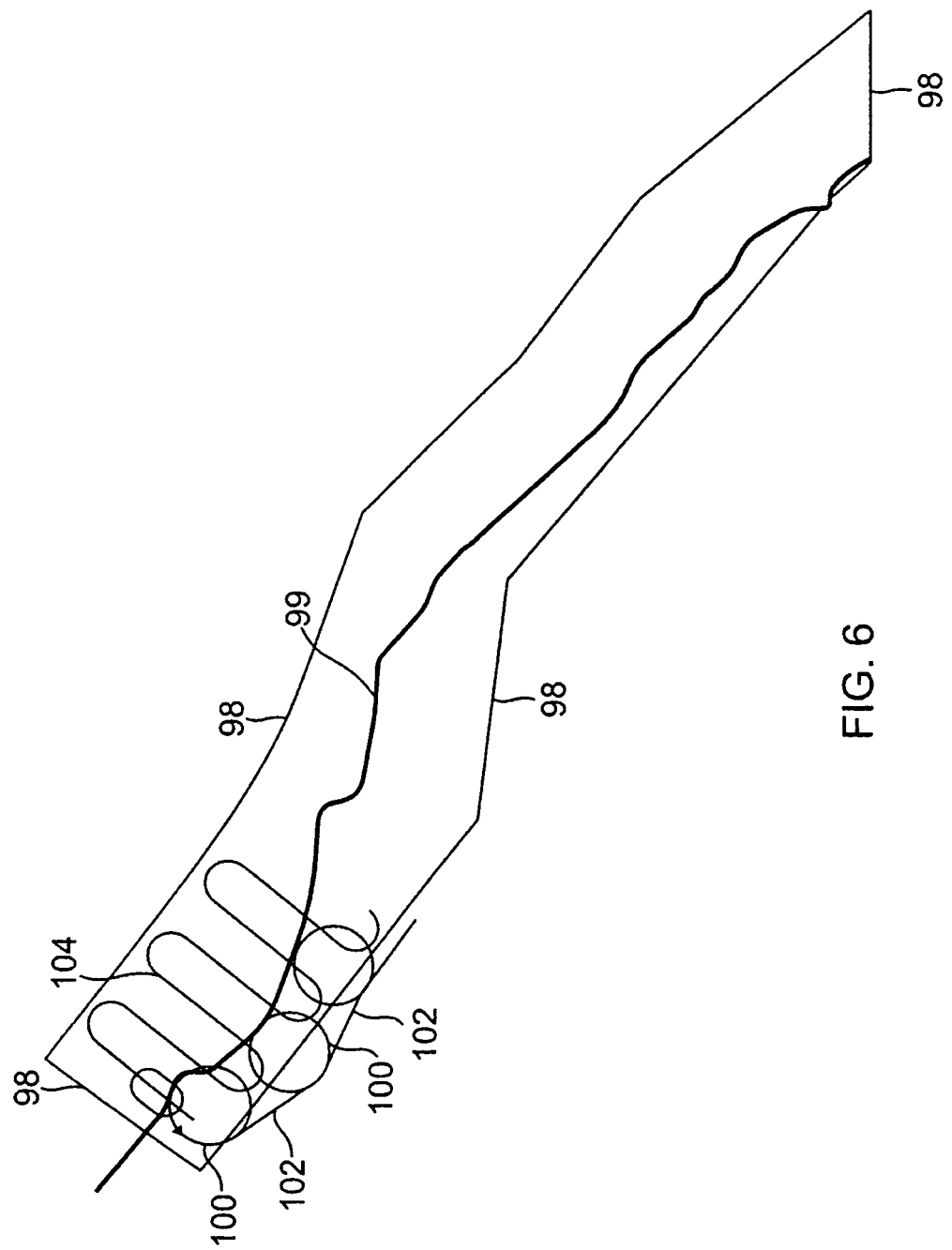
FIG. 6 is a schematic view of a systematic search pattern in which the UAV remains on one side of a border while capturing visual images across the border according to one embodiment.

Alternatively, the planner 42 and the region search module 52 may command the UAV to follow a systematic search pattern. FIG. 6 illustrates one such systematic pattern. The region search module 52 (FIG. 1) establishes search boundaries 98. As illustrated, the search boundaries overlap an international border 99 with a hostile nation. Thus, the planner module 42 works together with at least the command module 54 to establish a travel path for the UAV that keeps the UAV from crossing the border 99. As shown, the UAV follows a travel path represented by a series of loiter circles 100 joined by tangent lines 102. The circles 100 and lines 102 keep the UAV on one side of the border 99. However, the camera follows a scanning path 104 represented by a series of oppositely oriented U's that cross the border 99. The UAV moves from one loiter circle 100 to the next while the camera scans in the repeating U pattern 104 shown. Thus, while the UAV never violates the airspace of the hostile nation, the camera is nevertheless able to capture visual images within the hostile nation. This pattern of border avoidance is known as "lawn mowing," as it is analogous to a person who looks over his or her neighbor's fence as he or she mows his or her own lawn. The flight path traced by the UAV may include loiter circles 100 as shown in FIG. 6, and it may also include the weave and chase plans described above.

With reference to FIG. 1, the illustrated embodiment of the present system 20 includes a self-calibration planner module 106. At designated intervals the UAV may be commanded to enter a self-calibration mode. In this mode, the UAV loiters in a circle around a fixed surveyed location. In each quadrant of the loiter circle, the system 20 generates camera pointing commands at the fixed location. External sensors, such as GPS, are used to precisely locate the fixed target so that camera pointing errors can be measured. Differences between where the camera should be pointing and where it is actually pointing are then resolved so that target location errors are reduced and weapons probability of kill (PK) is increased. This calibration routine can be executed around a 360° sweep of the fixed location to characterize the repeatable errors in navigation and camera angle pointing. A characterization table may then be generated that can be used when calculating target location error (TLE) for a given target, as well as when compensating for camera pointing errors at known coordinates from other systems.

One instance in which it is advantageous to recalibrate the camera aboard the UAV is shortly after the UAV launches. Whether the UAV takes off from the ground under its own power, is launched from the ground or is launched from an airborne mother ship, the UAV can experience high G-forces during each of these procedures. The G-forces can cause servo errors and generate calibration problems. Therefore, the UAV may be commanded to self calibrate shortly after take-off/launch. For airborne launches, the UAV may fly in a circle about the mother ship, which may include differential GPS to precisely locate the mother ship. The UAV may also be commanded to self calibrate at one or more points during its mission. For example, the UAV may also be commanded to self calibrate at regular intervals.

With reference to FIG. 1, the illustrated embodiment of the present system 20 further includes a configuration manager module 108. The configuration manager 108, in combination with a storage device 110, saves one or more configurations of the present system 20. For example, the configurations may include operator inputs and target characteristics. By storing these configurations on the storage device 110, the configuration manager 108 can quickly recall them when the system 20 is restarted so that the configurations do not need to be learned again.

With continued reference to FIG. 1, the illustrated embodiment of the present system 20 further includes a record/playback module 112. The record/playback module 112 is configured to record data as the UAV(s) track various targets. The recorded data may be played back later to assist in evaluating the overall performance of the system 20.

In certain embodiments, the present system 20 may include an internet protocol-(IP) based addressing scheme. In such a scheme, each UAV in the system 20 is identifiable by a unique IP address, and all other UAVs and operators in the system 20 can communicate with each UAV using those addresses. This addressing scheme enables multiple UAVs to be incorporated into the system 20 regardless of what type of control system may have been previously built into each UAV. For instance, a UAV may have been manufactured by a first entity, and may be configured for operation according to the first entity's proprietary control system. The IP-based addressing scheme stands in front of the proprietary system so that the UAV can be incorporated into the present system 20 without requiring translation between control systems.

With reference to FIG. 1, in certain embodiments the present system 20 includes a set of utilities 114. Utilities 114 include a set of math functions and transforms that each of the modules may reference to perform the calculations to enable the Stalker system 20 to work.

Figure 7:
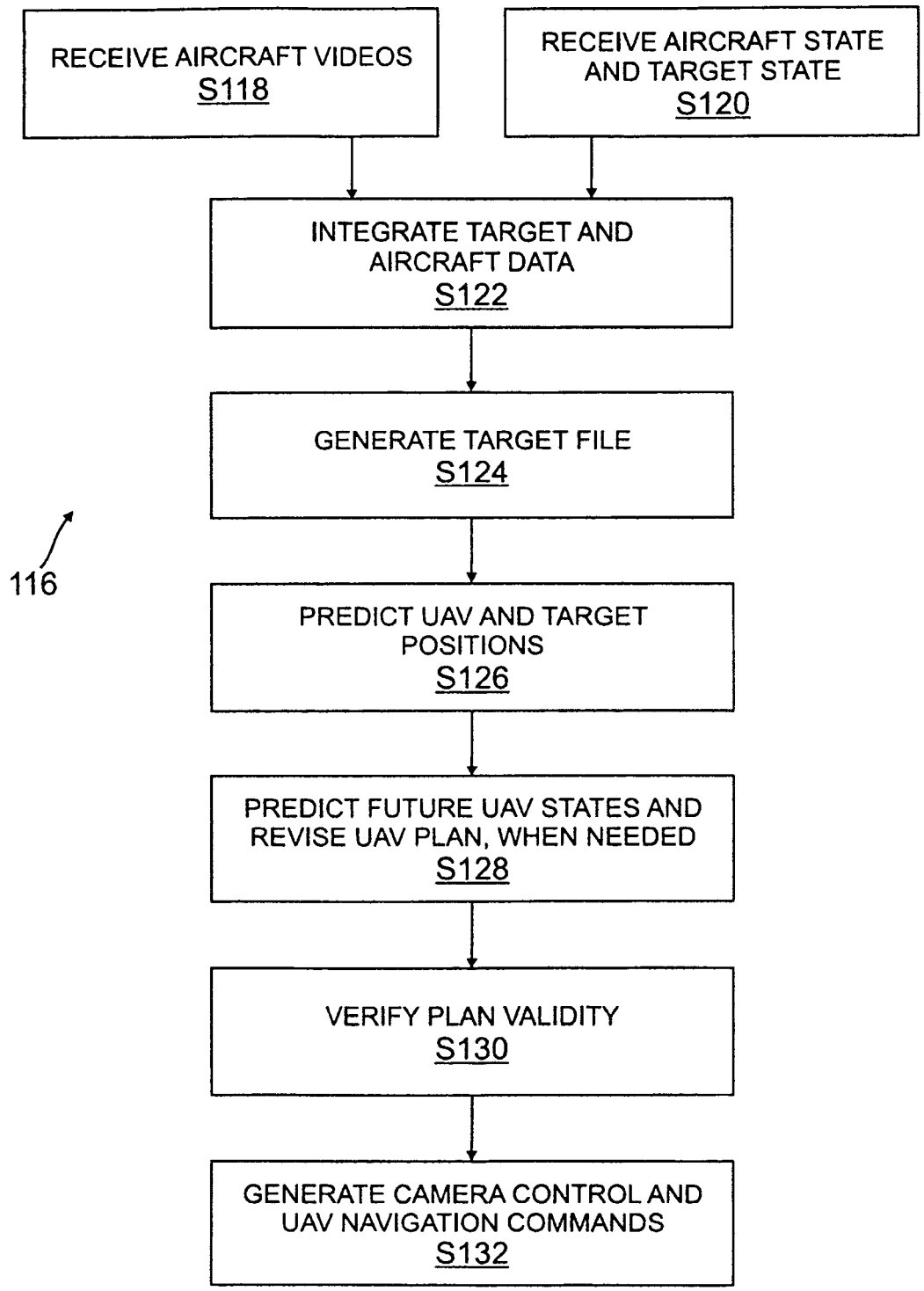
FIG. 7 is a process flow diagram for autonomously tracking a target using a UAV according to one embodiment.

FIG. 7 shows a process flow diagram 116 for autonomously tracking a target using a UAV. As an example, the process steps may be implemented using the various Stalker system 20 modules described above. Process flow 116 assumes that system 20 (FIG. 1) and its various modules are initialized and functional.

Turning in detail to FIG. 7, in step S118, video signals (for example, 26) are received from a UAV (not shown). In one example, ATR module 22 receives the video signal. ATR module 22 analyzes the video signals and generates an output for an integration module (for example, MSI 24). In step S120, UAV state and target state information is received by MSI module 24.

In step S122, MSI module 24 integrates the target state, UAV state and the filtered video information from ATR module 22 and in step S124, MSI module 24 generates a track file. As discussed above, the track file may include information regarding UAV and target kinematics, estimates for data accuracy, target related information, for example, size, class, target type, whether target is cooperative or non-cooperative or any other information.

In step S126, future UAV and target positions are predicted after comparing track file information with previous predictions.

In step S128, future UAV states are predicted and either UAV plan is created (if one does not exist) or an existing UAV plan is modified. In one embodiment, planner module 42 creates and modifies the UAV plan. The plan is based on inputs received from one or more modules, for example, target module 36, ownship module 38, weave corridor module 48, loiter module 50, legs module 46, region search module 52, command module 54 and camera module 56 that are described above. The plan itself may be a model to predict future UAV states.

In step S130, the plan is verified and validated. In one embodiment, the plan is validated by the command module. Thereafter, camera control commands and navigation commands are generated in step S132. Examples of various inputs/outputs for implementing and executing the process steps of FIG. 7 are described above.

Embodiments of the present system and methods can be implemented in a variety of ways, and can be used for a variety of purposes, in addition to those identified above. For example, the automated UAV command and control enabled by the present system and methods can be implemented in other intelligence, surveillance and reconnaissance (ISR) platforms. Examples of such ISR platforms include the Airborne Warning and Control System (AWACS), the P-8A Poseidon Multi-Mission Maritime Aircraft (MMA), the Wedgetail aircraft, the Broad Area Maritime Surveillance (BAMS), the ScanEagle UAV, and other Airborne Early Warning and Control (AEW&C) assets. The ISR platform may be stationary or moving.

The present system and methods can also be implemented in tactical aircraft, such as the V-22 Osprey. For example, the present system and methods may be used to control one or more UAV's from the tactical aircraft in preparation for a landing and troop deployment or evacuation. Prior to landing, the UAV(s) can be commanded from the tactical aircraft to surveil the landing area and neutralize any enemy targets present in the landing area. The UAV(s) thus reduce the likelihood of any troop casualties or loss of the aircraft during the landing operation, when the aircraft and the troops are relatively vulnerable.

When operating the present system from a tactical aircraft, the tactical aircraft may borrow one or more UAV's from another command and control center. For example, a tactical aircraft may be preparing for a landing and troop deployment or evacuation in which the landing area is in the vicinity of one or more UAV's that are under the control of a command and control center. As the tactical aircraft approaches the landing area, it may assume control of one or more UAV's from the command and control center to assist with the safe landing and deployment/evacuation. After the deployment/evacuation is complete and the tactical aircraft has safely cleared the landing area, the tactical aircraft may then return control of the borrowed UAV(s) to the command and control center.

The present system and methods can also be implemented in expeditionary ground forces. For example, the present system and methods may be used to control one or more UAV's from a ground vehicle, such as a Humvee. The UAV(s) may be used as air support to protect the ground forces during normal operations such as patrols and reconnaissance. In such an application, the ability of the present system to stalk a target (in this case the ground forces to be protected) enables the UAV(s) to follow and protect the ground forces as they move about, even if their movements are erratic. In addition, the UAV(s) may be controlled from a ground vehicle to surveil and clear an area of potential enemy combatants prior to deploying ground forces to that area.

The ability of the present system to stalk a target provides additional functionality in maintaining communication among ground forces. Sometimes communication between a first individual or group on the ground and a second individual or group on the ground requires that the individuals or groups have a clear line of sight between one another. If ground forces are deployed in a hilly or mountainous area, intervening terrain may render line-of-sight communications equipment useless. Even in generally flat areas, groups wishing to communicate may simply be out of range of one another. In such situations UAV's in the vicinity of the ground forces can be used as communications relays.

Figure 9:
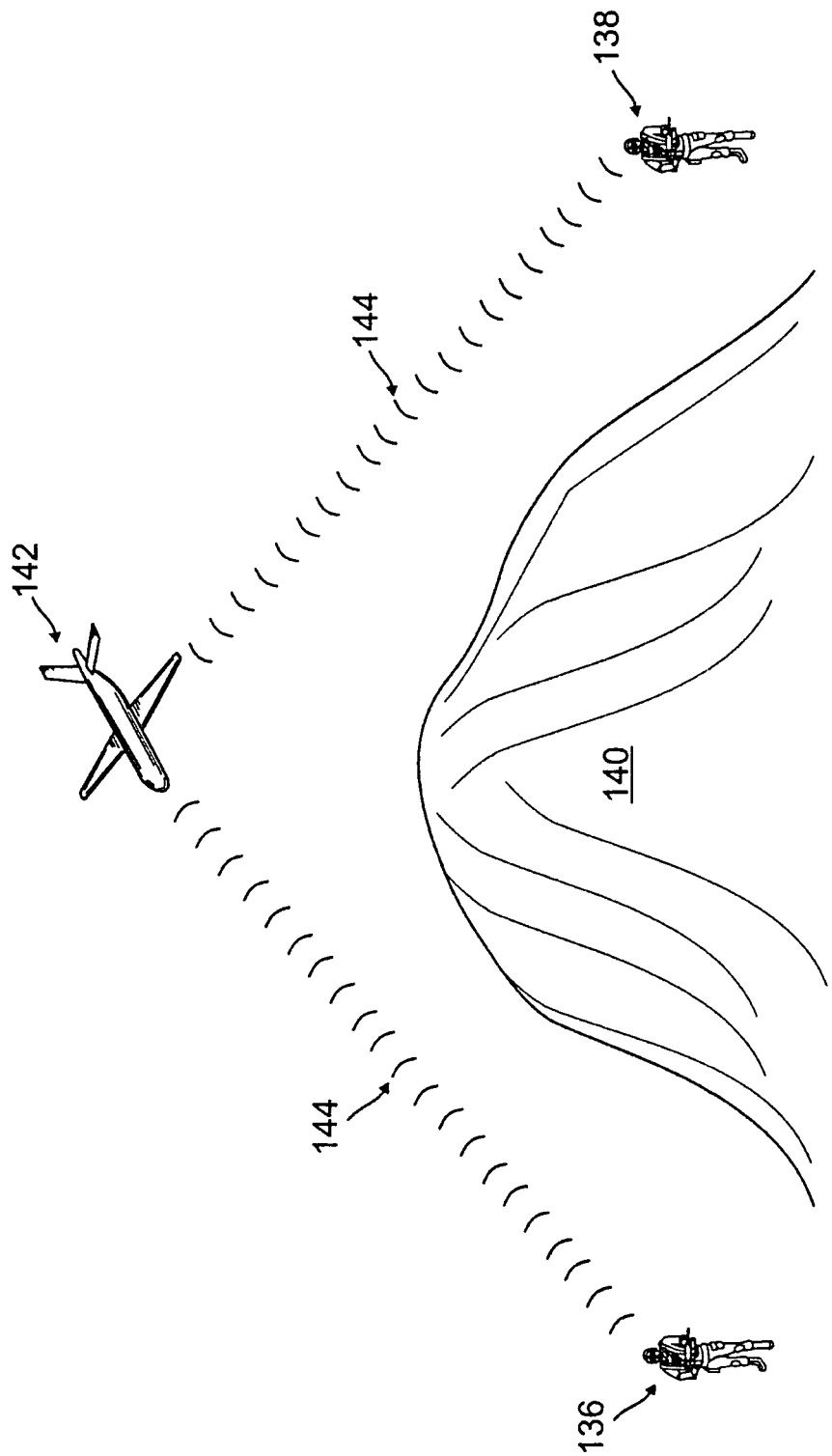
FIG. 9 is a schematic view of another embodiment of the present system including a UAV that acts as a communications relay.
Figure 10:
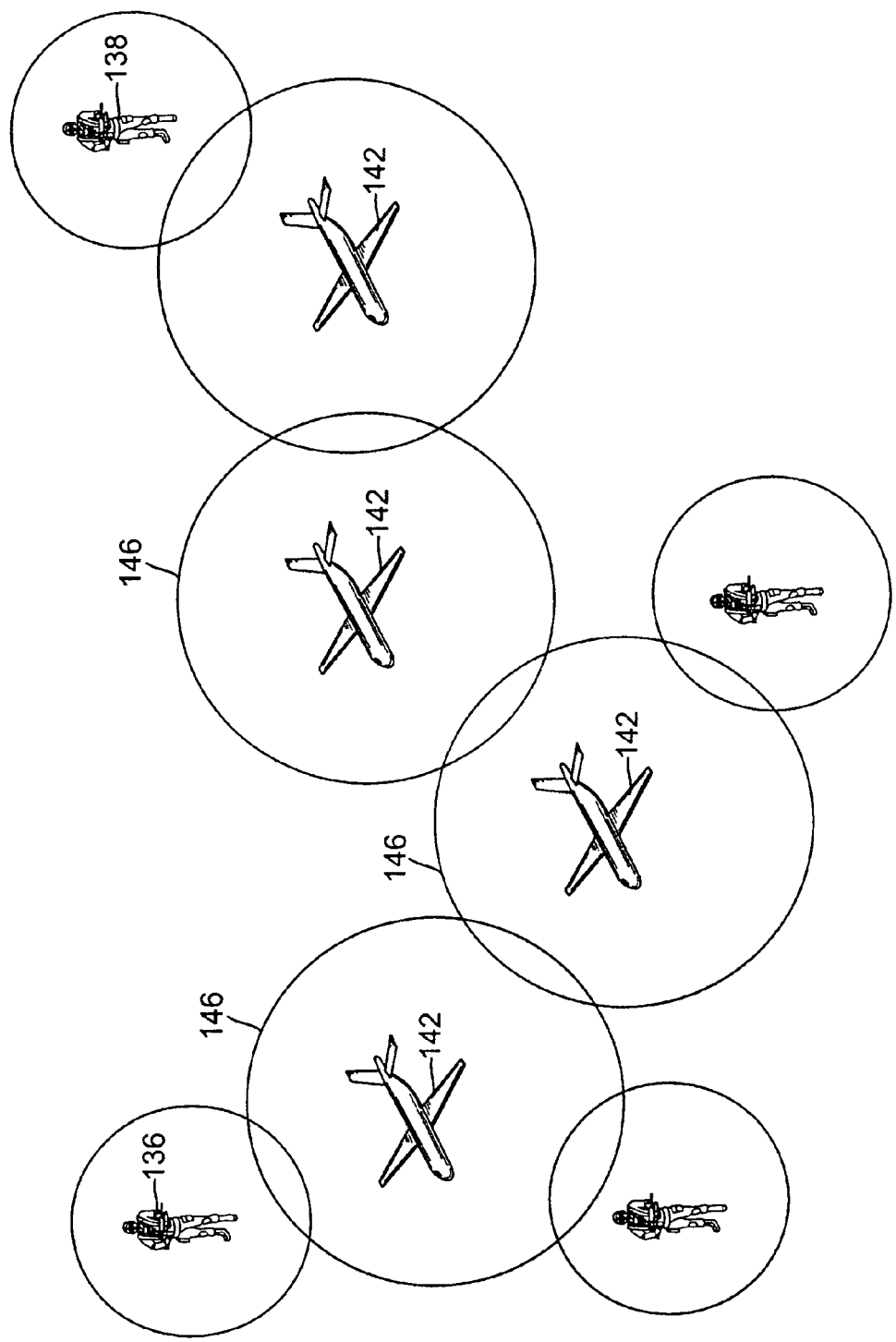
FIG. 10 is a schematic view of another embodiment of the present system including multiple UAV's that act as communications relays.

For example, with reference to FIG. 9 a first group 136 on the ground may desire to communicate with a second group 138 on the ground, but an intervening hill 140 prevents direct radio contact between the first and second groups 136, 138. If a UAV 142 is in the area of the first and second groups 136, 138, and within radio range of both groups, the groups can communicate with each other through the UAV 142. Each group 136, 138 can send radio transmissions 144 to the UAV, which then transmits the communications to the other group. With reference to FIG. 10, communications can be routed between groups by relaying the communications through more than one UAV. For example, the first group 136 may communicate with the second group 138 by routing the communications through four UAV's. The circles 146 surrounding each group 136, 138 and UAV 142 represent the communication range of each.

In a communications application, the stalker feature of the present system is useful to maintain a UAV, or multiple UAV's, within radio range of one or more ground based individuals or groups. The system can advantageously maintain the UAV(s) within radio range of a group without giving away the group's position. For example, rather than circling overhead a group, the system can command a UAV to fly at an offset to the group and/or to follow a random flight path that nevertheless maintains the UAV within radio range of the group. Although the foregoing example involves radio communications, the present system can be used as a communication relay for other types of transmissions, such as video or ATR data or any other data such as the track file.

The present system and methods can also be implemented in naval forces platforms. Seaborne ships can be used as mobile command centers for controlling UAV's according to the present system and methods. Stationary seaborne platforms, such as oil drilling/pumping platforms can also be used as stationary command centers. The present embodiments can also be used to protect seaborne assets regardless of where the command center is located. For example, a ground station may command UAV's using the present system to protect a surface action group (a group of ships), or individual ships within a surface action group.

Figure 11:
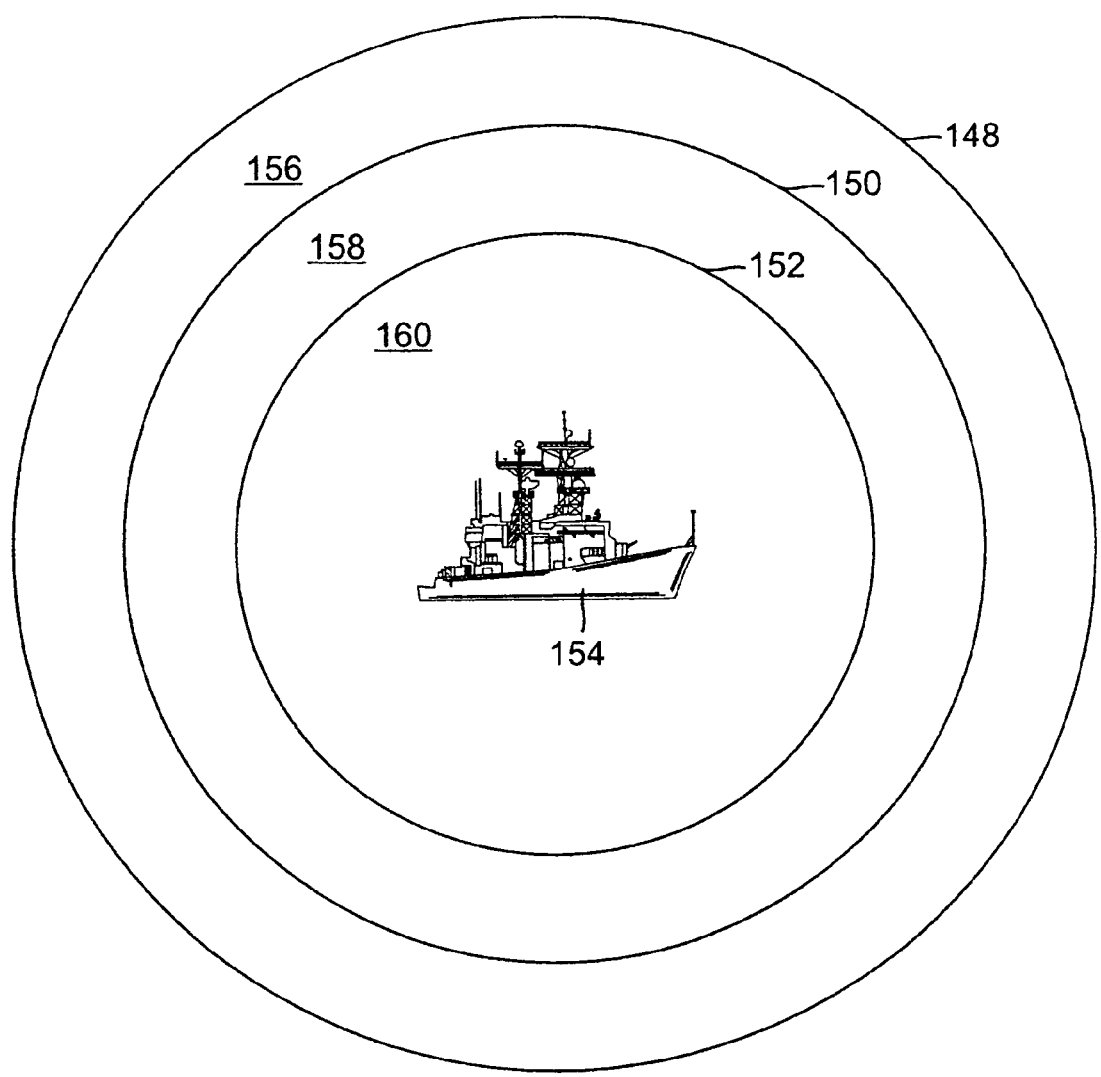
FIG. 11 is a schematic view of another embodiment of the present system including multiple defensive zones established around an asset.

Embodiments of the present system and methods can be used to protect assets according to a variety of different methodologies, including those described above. In one methodology, illustrated in FIG. 11, a plurality of boundaries 148, 150, 1.52 may be established 15 around an asset 154. In the illustrated embodiment, three boundaries are illustrated 148, 150, 152, and all are concentric circles with the asset 154 at the center. However, those of ordinary skill in the art will appreciate that alternative embodiments may include fewer or more boundaries, and that the boundaries may not necessarily be circular or concentric. For example, for moving assets the boundaries may be constantly changing, and over time may trace a path 20 resembling a straight line, a curved line, a "worm" (a path having any number of twists and turns), etc.

The boundaries define edges of zones 156, 158, 160, with each zone more proximate to the asset indicating an increased threat level from a target entering the zone. For example, the outermost boundary 148 and zone 156 may define a situation awareness zone. The present embodiments may monitor this zone in order to detect targets, but may do little else beyond identifying the fact that a target is present within the situation awareness zone. One or more UAV's may be tasked to perform light defensive measures, such as continuing to monitor the situation awareness zone for the presence of additional targets and tracking any movements of known targets.

The boundary 150 just inside the outermost boundary may define an identification (ID) zone 158. When targets enter this zone 158, UAV's may be tasked to perform more intensive defensive measures, such as close surveillance of known targets within the ID zone. The close surveillance is generally intended to identify the target, determine its intentions and assess what threat, if any, the target poses to the asset.

The boundary 152 just inside the ID zone 158 may define an engage or avoid zone 160. When targets enter this zone 160, UAV's may be tasked to perform even more intensive defensive measures, such as engaging and destroying the target. In the case of a mobile asset 154, the present embodiments may determine that the threat posed by the target is great enough that the asset should flee (avoid the target). The present embodiments may also determine that the asset should not only flee, but that UAV's should also attack the target and attempt to disable or destroy it.

The sizes and/or shapes of the zones 156, 158, 160 may depend upon a perceived threat, and/or kinematics of the asset and/or the target. For example, characteristics that may influence the sizes and/or shapes of the zones include whether the asset is stationary or mobile, the asset's top speed if it is mobile, what type of weaponry, if any, the asset has and the known effective range of the weaponry, the target's top speed and weaponry, if any, and the known effective range of the target's weaponry, etc. Larger zones may be provided for targets having high top speeds and long range weaponry, for example. The zone sizes may also be dynamic, since determinations regarding the target's top speed and weaponry may not be made until the target enters the ID zone 158. Once a target enters this zone and it is determined that the target has a high top speed and/or long range weaponry, the size of the engage or avoid zone may be increased.

The foregoing discussion has focused on embodiments of the present system and methods that involve UAV's. However, those of ordinary skill in the art will appreciate that the present embodiments are readily adaptable for use in unmanned automated ground patrols and unmanned automated sea patrols. Such embodiments include the use of unmanned ground and seaborne vehicles instead of or in addition to UAV's. Other embodiments may include non-military vehicles, structures, robotics, personnel, space environment platforms, and animals. For example, embodiments of the present system may be used to stalk endangered animals to prevent poaching.

The above description presents the best mode contemplated for carrying out the present system and methods for autonomous tracking and surveillance, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of providing communication between a first individual or group and a second individual or group, where the first individual or group and the second individual or group cannot communicate directly with one another, the method comprising the steps of:
   deploying a first unmanned vehicle and a second unmanned vehicle to a location in a vicinity of both the first individual or group and the second individual or group, wherein the first individual or group and the second individual or group cannot communicate directly with one another;
   receiving air vehicle state information for the first unmanned vehicle and the second unmanned vehicle;
   receiving target state information for the first individual or group and the second individual or group;
   relaying communications between the first individual or group and the second individual or group sequentially through both the first unmanned vehicle and the second unmanned vehicle; and
   the first unmanned vehicle autonomously tracking the first individual or group and predicting a first future state of the first individual or group based on the target state information;
   predicting a future state of the first unmanned vehicle based on the air vehicle state information;
   generating a travel path for the first unmanned vehicle based on predicted future states of the first unmanned vehicle and the first individual or group, the travel path comprising a constrained random travel path commanded by a computer implemented module, that avoids making a position of the first individual or group apparent to third parties, and maintains the communications between the first individual or group and the second individual or group through both the first unmanned vehicle and the second unmanned vehicle; and
   the first unmanned vehicle and the second unmanned vehicle following the constrained random travel path by following a plurality of headings selected at random, by changing from one heading in the plurality of headings to a next heading in the plurality of headings at random intervals, by maintaining the first unmanned vehicle within a first radio range of the first individual or group such that the first individual or group is capable of communicating directly with the first unmanned vehicle, and by maintaining the second unmanned vehicle within a second radio range of the second individual or group such that the second individual or group is capable of communicating directly with the second unmanned vehicle.

2. The method of claim 1, further comprising generating a weave plan for the first unmanned vehicle, the weave plan being designed to maintain a desired distance between the first unmanned vehicle and the first individual or group while the first individual or group is moving and while maintaining the first unmanned vehicle within an airspace boundary.

3. The method of claim 1, further comprising the step of maintaining an offset between the first unmanned vehicle and the first individual or group in order to avoid making the position of the first individual or group apparent to third parties.

4. The method of claim 1, further comprising the step of the first unmanned vehicle following the constrained random travel path that nevertheless maintains a desired distance between the vehicle and the first individual or group.

5. The method of claim 1, wherein the first unmanned vehicle and the second unmanned vehicle are unmanned aircraft.

6. The method of claim 1, further comprising generating a loiter plan for the first unmanned vehicle, the loiter plan being designed to maintain a desired distance between the first unmanned vehicle and the first individual or group while the first individual or group is stationary.

7. The method of claim 1, further comprising analyzing an anticipated path of travel for the first unmanned vehicle and the second unmanned vehicle and determining whether the path crosses into any restricted airspace or intersects any obstructions.

8. The method of claim 1, wherein the travel path for the first unmanned vehicle and the second unmanned vehicle is configured to maintain the first unmanned vehicle and the second unmanned vehicle within a predetermined boundary.

9. The method of claim 1, wherein the first individual or group is sea based.

10. The method of claim 1, wherein generating the travel path comprises developing the travel path such that the travel path comprises a plurality of boundaries around the first individual or group.

11. The method of claim 1 further comprising tracking movement of the second individual or group and generating a flight path to maintain a desired distance between the first individual or group and the second individual or group.

12. The method of claim 1, wherein the second unmanned vehicle and the second individual or group comprise unmanned airborne vehicles.

13. A method of providing communication between a first asset in motion and a second asset in motion, where the first asset and the second asset cannot communicate directly with one another, the method comprising the steps of:
   deploying a vehicle, the vehicle comprising an unmanned airborne vehicle, to a location in a vicinity of both the first asset and the second asset, the first asset in continuous communication with the vehicle and the second asset in continuous communication with the vehicle;
   receiving vehicle state information for the vehicle;
   receiving target state information for the first asset and the second asset;
   relaying communications between the first asset and the second asset through the vehicle;
   the vehicle autonomously tracking the motion of the first asset and the second asset;
   predicting a first future position of the first asset and a second future position of the second asset based on the target state information;
   generating a travel path for the vehicle based on the vehicle state information, the travel path comprising a constrained random travel path commanded by a computer implemented module and configured to avoid making the position of the first asset and the position of the second asset apparent to third parties; and
   following, by the unmanned airborne vehicle, the constrained random travel path by following a plurality of headings selected at random, by changing from one heading in the plurality of headings to a next heading in the plurality of headings at random intervals, and by maintaining the vehicle within a radio range of the first asset and the second asset such that the first asset is capable of continuously communicating directly with the vehicle and the second asset is capable of continuously communicating directly with the vehicle.

14. The method of claim 13 further comprising the step of maintaining an offset between the unmanned vehicle and the first asset in order to avoid making the position of the first individual or group apparent to third parties.

15. The method of claim 13, further comprising the step of the vehicle following the constrained random travel path that maintains a desired distance between the vehicle and the first asset.

16. The method of claim 13, further comprising generating a loiter plan for the vehicle, the loiter plan configured to maintain a desired distance between the vehicle and the first asset.

17. The method of claim 13, further comprising analyzing an anticipated path of travel for the vehicle and determining whether the path crosses into any restricted airspace or intersects any obstructions.

18. The method of claim 13, wherein the travel path for the vehicle is configured to maintain the vehicle within a predetermined boundary.

19. The method of claim 13, further comprising generating a weave plan for the vehicle, the weave plan configured to maintain a desired distance between the vehicle and the first asset and to maintain the vehicle within an airspace boundary.

20. A method comprising:
deploying a vehicle, the vehicle comprising an unmanned airborne vehicle, to a location in a vicinity of both a first asset in motion and a second asset in motion, the first asset in motion in communication with the vehicle and the second asset in motion in communication with the vehicle;

receiving air vehicle state information for the vehicle;

receiving target state information for the first asset and the second asset;

relaying communications between the first asset in motion and the second asset in motion through the vehicle;

the vehicle autonomously tracking the motion of the first asset in motion and the second asset in motion;

predicting a first future position of the first asset in motion and a second future position of the second asset in motion, the predicting based on the target state information; and generating, by a computer implemented module, a travel path for the vehicle based on the air vehicle state information, the travel path comprising one of a random travel path configured to avoid making the position of the first asset in motion and the position of the second asset in motion apparent to third parties and a weave plan configured to maintain a desired distance between the vehicle and the future position of the first asset in motion and between the vehicle and the future position of the second asset in motion, wherein the travel path is configured to maintain the vehicle within a radio range of both the first asset in motion and the second asset in motion such that the first asset in motion is capable of communicating directly with the vehicle and the second asset in motion is capable of communicating directly with the vehicle.

* * * * *